(12) United States Patent
Yanagi

(10) Patent No.: US 6,345,045 B1
(45) Date of Patent: Feb. 5, 2002

(54) SYNCHRONOUS CAPTURE CIRCUIT FOR CODE DIVISION MULTIPLE ACCESS COMMUNICATION

(75) Inventor: Shuzo Yanagi, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/100,896

(22) Filed: Jun. 22, 1998

(30) Foreign Application Priority Data

Jun. 24, 1997 (JP) .............................................. 9-167401

(51) Int. Cl.[7] .............................................. H04B 7/216
(52) U.S. Cl. ........................ 370/342; 370/479; 375/142; 375/149; 375/150
(58) Field of Search ................................ 370/342, 320, 370/335, 316, 441, 479, 350, 365, 367, 203, 208, 209; 375/130, 131, 140, 141, 142, 147, 149, 150; 455/426, 428, 525, 550, 422

(56) References Cited

U.S. PATENT DOCUMENTS 5,457,813 A * 10/1995 Poutanen 6,052,602 A * 4/2000 Yamamoto

FOREIGN PATENT DOCUMENTS

| JP | 4-172728 | 6/1992 |
|---|---|---|
| JP | 6-21914 | 1/1994 |
| JP | 7-50613 | 2/1995 |
| JP | 7-297805 | 11/1995 |
| JP | 8-116293 | 5/1996 |
| JP | 8-307314 | 11/1996 |
| KR | 0140778 | 3/1998 |

* cited by examiner

Primary Examiner—William Luther
(74) Attorney, Agent, or Firm—Sughrue Mion, PLLC

(57) ABSTRACT

The CDMA synchronous capture circuit which calculates correlation values by using a part of received data for the detection of the peak position, and then decides an upper temporal peak position where the correlation values are great. The CDMA synchronous capture circuit of the present invention calculates the remaining correlation values, giving priority over the temporal peak position, by using the remaining received data, and finally decides a peak value from the correlation level by adding the above-mentioned two kinds of correlation values.

4 Claims, 3 Drawing Sheets

SYNCHRONOUS CAPTURE CIRCUIT FOR CODE DIVISION MULTIPLE ACCESS COMMUNICATION

BACKGROUND OF THE INVENTION

1. Field of the Invention

The present invention relates to a receiving equipment using a code division multiple access (CDMA) system, particularly to a synchronous capture circuit for the CDMA receiving equipment used in a mobile communication system.

2. Description of the Prior Art

Generally, in CDMA system, a transmitting equipment transmits data signal by spectrum diffusion modulation using diffusion signature, and a receiving equipment demodulates the received data by the inverse diffusion using a replica of the diffusion signature, for example, M (Maximum Length Code) sequence signature or GOLD signature.

The above-mentioned receiving equipment in CDMA system is provided with a synchronous capture circuit which estimates correctly the phase of diffusion signature (diffusion signal generation timing) for inversely diffusing the received signal. Particularly, in the receiving equipment, the synchronous capture circuit estimates the diffusion signature generation timing within the accuracy of one period (one chip) of the diffusion signature generation timing in the transmitting equipment. Then, a diffusion signature generator of an inverse diffusion circuit in the receiving equipment starts acting at the above-mentioned generation timing.

Here, referring to FIG. 3, one of conventional CDMA synchronous capture circuit is explained. The synchronous capture circuit shown in FIG. 3 is provided with receiving antenna 11 for receiving the signal from the transmitting equipment (not shown), quasi synchronous detector 12 for converting the received signal to base band signal, A/D converter 13 for converting the base band signal to digital data, correlator 14 for calculating correlation value from the digital data after A/D conversion, phase shifter 15 for shifting the diffusion signature generation timing by prescribed time, memory 16 for storing the correlation value of one period of the diffusion signature, received signal level detector 17 for detecting the maximum correlation value in one period of the correlation value, and clock generator 18 for generating clock. Further, correlator 14 is provided with multiplier 141, integrator 142, and diffusion signature generator 143 for generating diffusion signature at prescribed timing.

In the CDMA synchronous capture circuit shown in FIG. 3, the RF signal received by receiving antenna 11 is converted to base band signal by quasi synchronous detector 12 and then, converted to digital signal by AID converter 13.

Then, the digital signal is fed to correlator 14.

Correlator 14 multiplies the diffusion signature sequence outputted from diffusion signature generator 143 and the digital signal outputted from D/C converter 13, in one chip unit. Then, the output of multiplier 141 is inputted into integrator 142, and accumulated over the length of the diffusion signature sequence.

The output from integrator 142 becomes the correlation value at a certain diffusion signature generation timing in the diffusion signature sequence.

The output of correlator 14 is stored in memory 16. Particularly, after the correlation values were outputtted from correlator 14, the phase of diffusion signature generator 143 is shifted by prescribed time smaller than the chip rate of the diffusion signature and similarly calculates the correlation value of the received signal using the diffusion signature generation timing shifted as mentioned above, and stores the calculation result in memory 16.

Thus, the correlation values over at least one period (one chip) of the diffusion signature sequence are calculated and stored in memory 16.

Next, signal level detector 17 selects the delay position of the received signal that has the maximum correlation value from the correlation value stored in memory 16. Using this delay position of the received signal, the received signal is inversely diffused by the inverse diffusion circuit (not shown) by using the diffusion signature sequence generated from the above-mentioned delay position of the received signal as a replica.

Besides, the amplitude and phase of the signal received by the receiving equipment varies at all times, because the transmission line between a base station and a mobile station in mobile communication. Accordingly, the quality of the maximum correlation value is improved, if the correlation value over one period (one chip) of the diffusion signature to be stored in memory 16 is calculated more than twice.

In mobile communication, because a communication equipment moves, the communication equipment receives multipath waves reflected by a plurality of obstacles as well as a direct wave from a transmitter. These multipath waves arrive shortly after the direct wave in urban area, because many obstacles such as buildings stand nearby, while they arrive after much delay in suburbs, because there are few obstacles near the mobile transmitter/receiver.

By using the CDMA system, the multipath can be separated, if the time interval of the generation of multipath waves is greater than one chip of the diffusion signature. Further, the quality of received signal can be improved by the path diversity by synthesizing multipath (RAKE synthesis).

However, in order to implement RAKE synthesis in the suburbs as well as in the urban area, it is necessary to detect multipath presicely. Particularly, in the suburbs, search range must be long enough to cover the arrival of the multipath waves. However, the longer the search range is, the more enormous is the quantity of processing for the calculation of the correlation values in the synchronous capture circuit. Further, the reduction of the processing time results in the increase in the number of the correlator, the increase in the enlargement of the whole circuit, and the increase in power consumption with the broadening of the frequency range.

Thus, conventional CDMA synchronous capture circuit has a disadvantage that the wider the synchronous capture range is, the longer the processing time is.

SUMMARY OF THE INVENTION

Therefore, an object of the present invention is to provide a CDMA synchronous capture circuit for reducing the quantity of calculation of the correlation values.

The CDMA synchronous capture circuit of the present invention calculates correlation value by using a part of received data for the detection of the peak position by using the correlation values and then, decides an upper temporal peak position where the correlation values are great.

Then, the CDMA synchronous capture circuit of the present invention calculates the remaining correlation values, giving priority over the temporal peak position, by using the remaining received data, and finally decides a peak value from the correlation level by adding the above-mentioned two kinds of correlation values. Whereby the quantity of processing is reduced.

The CDMA synchronous capture circuit of the present invention calculates temporal correlation values by using the the first "k" calculations among "n" (n:integer. k<n) calculations of correlation value for accumulating diffusion signature sequences in a search range, and detects the upper "m" phase positions, and holds the received phases and the correlation values only for such signature generation timings that each correlation value calculated by the first "k" calculations is greater than a prescribed threshold value. At first, the upper "m" phase positions are added to the remaining "(n−k)" correlation values to obtain the final correlation value.

Next, remaining "(n−k)" correlation values are added to the correlation values corresponding to the remaining received phases. Then, if the result of addition is greater than the correlation values obtained beforehand for the "m" phase positions, the values obtained beforehand are replaced by the greater values.

As explained above, the CDMA synchronous capture circuit for detecting the peak position in the prescribed search range decides at first a temporal peak position by the correlation calculation by using a part of the received data and next, calculates the final peak value by calculating the remaining correlation values, by using the remaining received data and by adding two correlation values. On the other hand, the CDMA synchronous capture circuit of the present invention does not calculate any correlation value at the diffusion signature generation timing, where the accumulated correlation values by the data received beforehand are smaller than a prescribed threshold value.

Accordingly, the processing time for detecting the maximum peak can effectively be shortened, when the search range is very broad.

Further, according to the present invention, the quantity of the calculation of correlation values per one search can effectively be reduced. Thus, the number of the correlators can effectively be reduced, and the scale of the whole circuit can effectively be reduced.

DESCRIPTION OF THE PREFERRED EMBODIMENT

Figure 1:
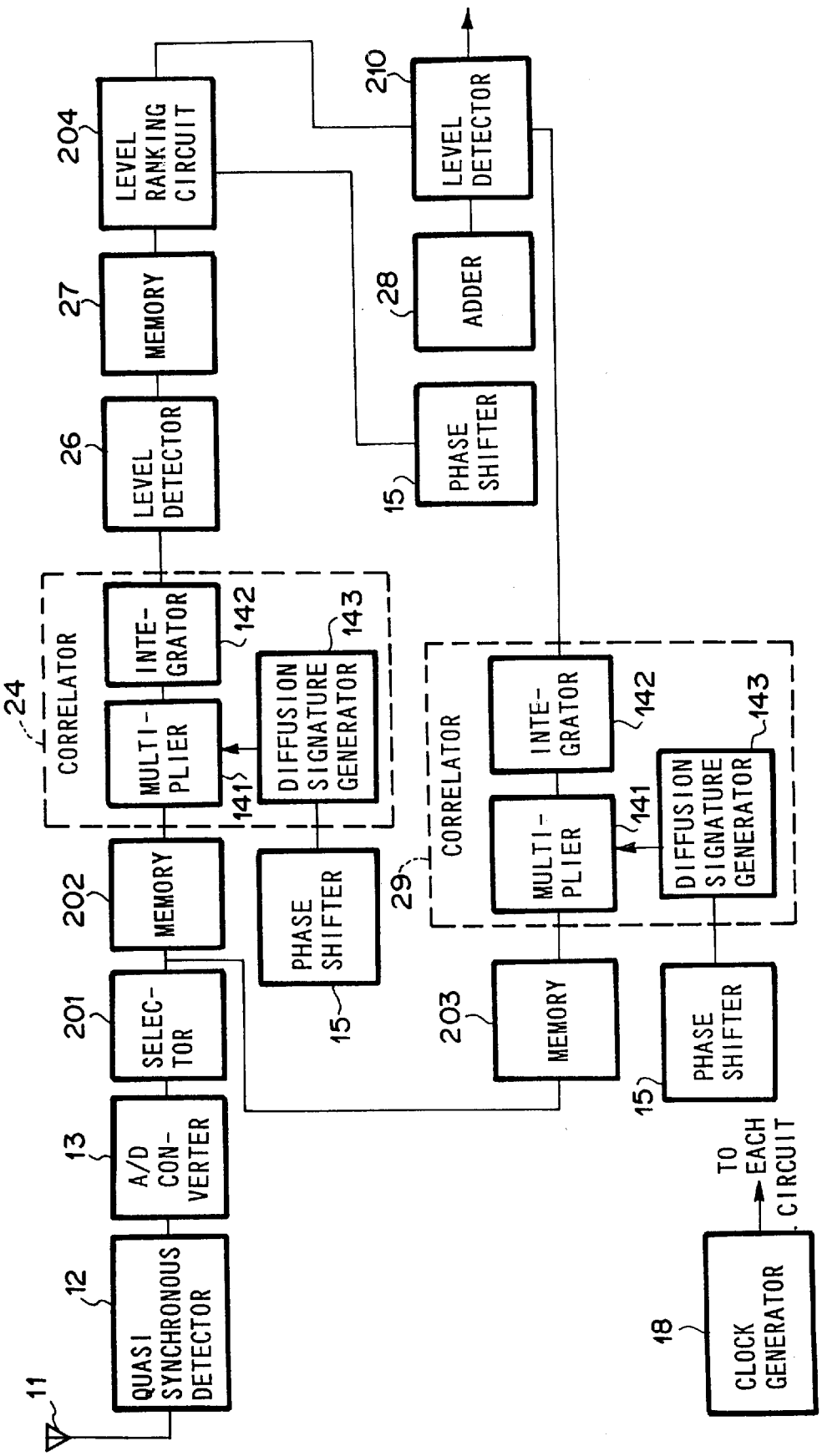
FIG. 1 is a block diagram of a CDMA synchronous capture circuit of the present invention.

The modes of embodiment of the present invention are explained referring to the drawings.

Figure 3:
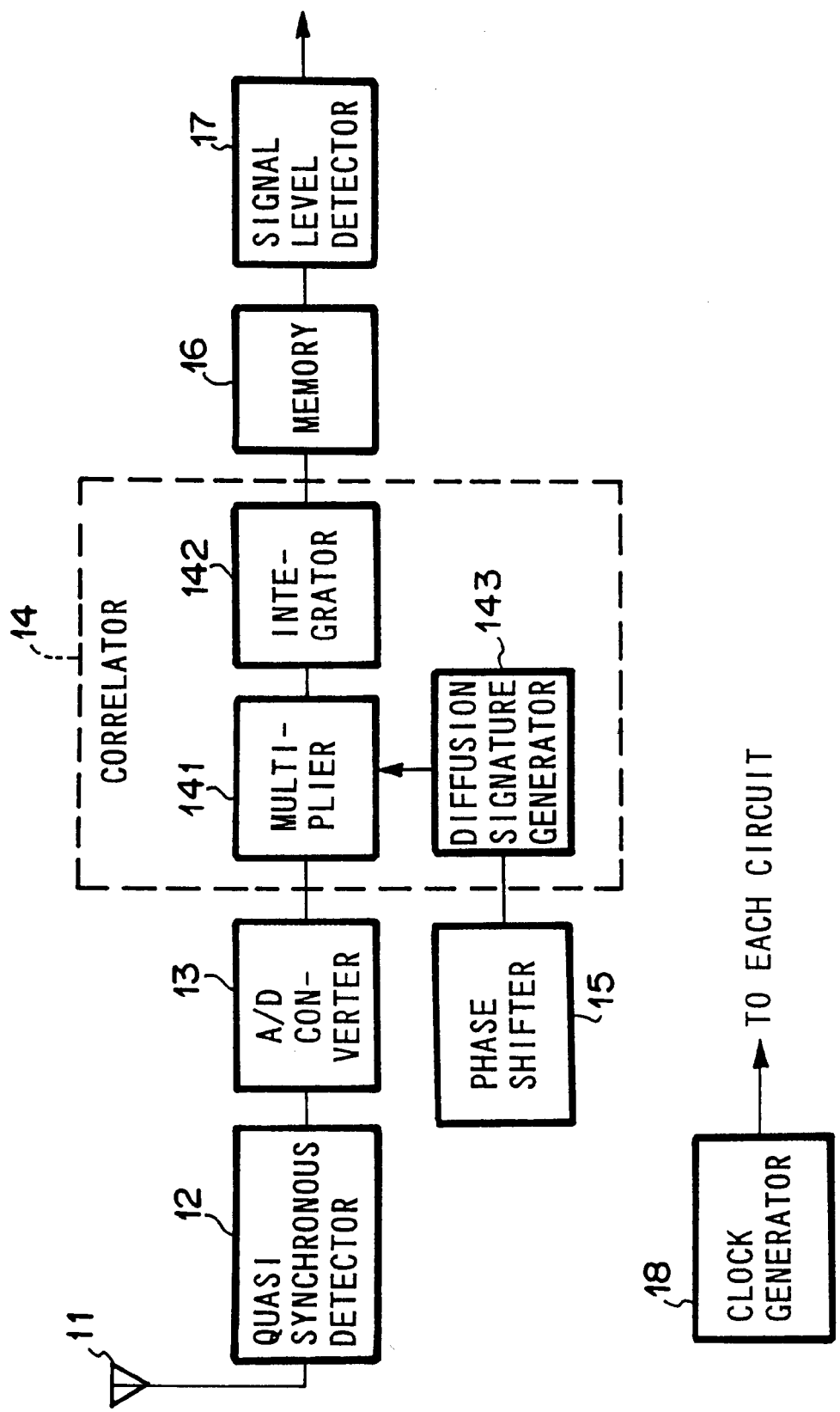
FIG. 3 is a block diagram of conventional CDMA synchronous capture circuit.

Reference numerals set forth in FIG. 1 apply to the same elements shown in FIG. 3.

In the CDMA synchronous capture circuit as shown in FIG. 1, the RF signal received by receiving antenna 11 is converted into base band signal by quasi synchronous detector 12, and then converted to digital signal by A/d coverter 13. This digital signal is fed to selector 201.

Selector 201 divides the received data necessary for synchronous detection in a search range by prescribed time unit, and store them as the first data and the second data in the first memory 202 and the second memory 203, respectively.

The first correlator 24, provided with multiplier 141, integrator 142, and diffusion signature generator 143, integrates, over the length of the diffusion signature sequence multiplied by an integer, the multiplication result of the diffusion signature sequence outputted from diffusion signature generator 143 and the output signal from the first memory 202. The output of the first correlator 24 or the first correlation values are inputted into the first level detector 26, and stored along with the diffusion signature generation timings in the third memory 27, if they are greater than a prescribed threshold value. On the other hind, if they are smaller than the threshold value, they are not stored in the the third memory 27.

The output of the third memory 27 is inputted into level ranking circuit 204 and L (L:integer greater than 1) phase positions and L correlation values are arranged and held in level ranking circuit 204 in order of greatness of the correlation value. The phase information held in level ranking circuit 204 is inputted into phase shifter 15 and on the basis of this received phase information and of the outputted data from memory 203, correlation values are calculated by the second correlator 29. In this connection, the second correlator 29 is constructed and actuated like the the first correlator 24.

Adder 28 adds the output from the second correlator 29 to the output of ranking circuit 204. Accordingly, the output from adder 28 becomes the correlation values by the received data given by the output from A/D converter 13. Then, the output from adder 28 is inputted into the second level detector 210.

By iteration of the above-mentioned procedure, L final correlation values as the output from level ranking circuit 204 can be calculated and inputted into the second level detector 210, which arranges these L values in order of greatness of correlation value.

Similarly, concerning the remaining received phases stored in the third memory 27, the correlation calculation is conducted by the second correlator 29, and the output from level ranking circuit 204 and the output from the second correlator 29 are added by adder 28. The output from adder 28 is inputted into the the second level detector 210. Then, if the result of addition is greater than the minimum value of the L values calculated beforehand, the third memory 27 is rewritten by the result of addition.

Thus, by calculating correlation values concerning all the received phases stored in the third memory 27, the upper L phases and the corresponding correlation values are stored in the second level detector 210. In this connection, the received phase position such that the correlation value becomes maximum is fed, as the diffusion signature generation timing, to inverse diffusion circuit (not shown).

Figure 2:
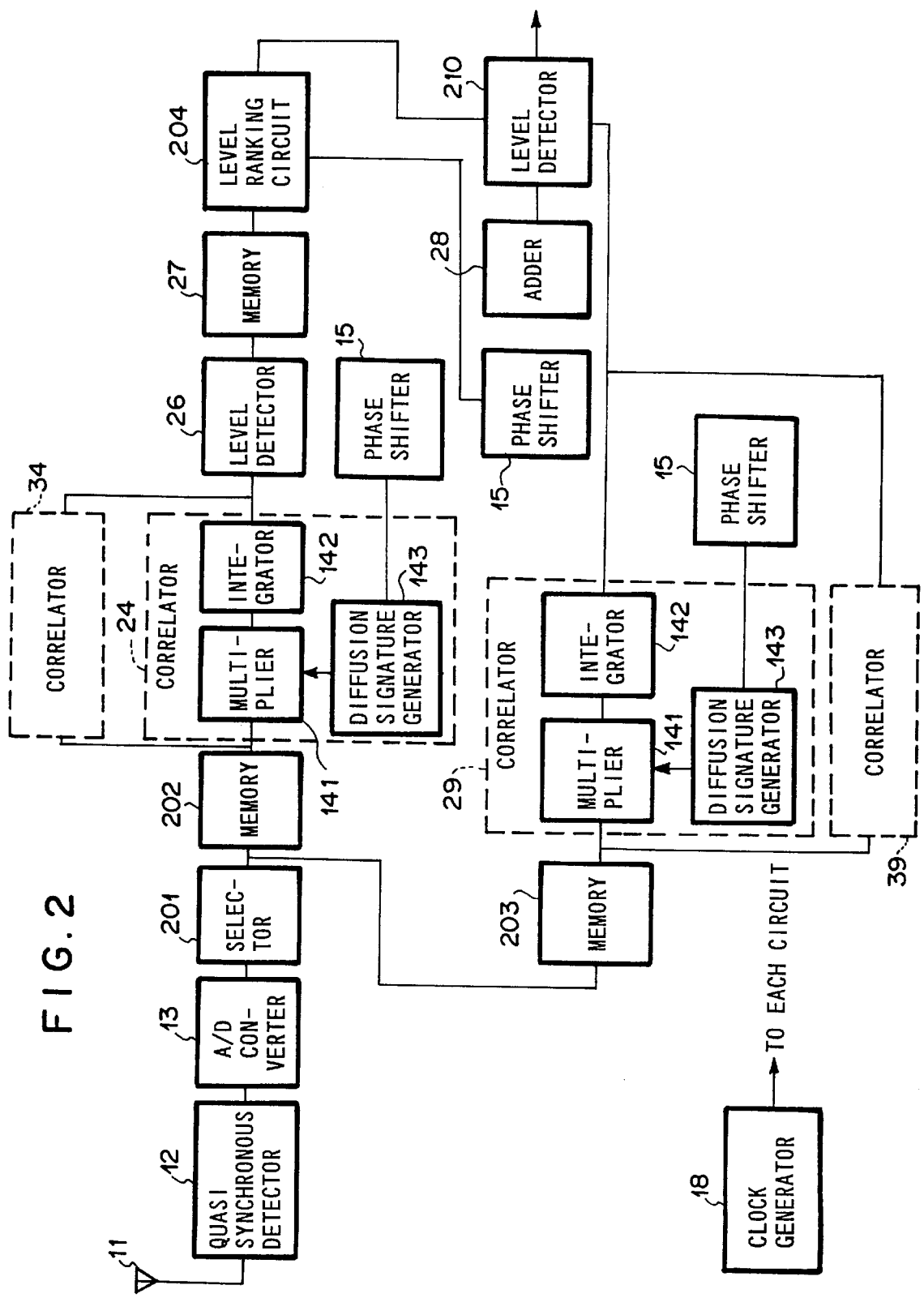
FIG. 2 is a block diagram of another CDMA synchronous capture circuit of the present invention.

Referring to FIG. 2, another embodiment of CDMA synchronous capture circuit of the present invention is explained. The numerals set forth in FIG. 2 apply to the same elements shown in FIGS. 1 and 3.

The embodiment as shown in FIG. 2 comprises 2 sets of correlator couple, namely, correlators 24 and 29, correlators 34 and 39, each of which has the same construction.

In the CDMA capture circuit as shown in FIG. 2, the RF signal received by receiving antenna 11 is converted to base band signal by quasi synchronous detector 12, and then converted to digital signal by A/D converter 13. Then, this digital signal is inputted into selector 201, Selector 201 divides the received data in a search range necesary for synchronous detection by a prescribed time unit, and inputs them as the the first received data and the the second received data into the first memory 202 and the second memory 203, respectively.

The first correlator 24 integrates the diffusion signature sequence outputted from diffusion signature generator 143 and the output signal from the first memory 202 over the length of the diffusion signature sequence multiplied by an integer.

The output of the first correlator 24 is inputted into the first level detector 26. Then, if the correlation values are greater than a prescribed threshold value, then the diffusion signature generation timings and the correlation values are stored in the third memory 27. On the other hand, if the correlation values are smaller than the prescribed value, then the diffusion signature generation timings and the correlation values are not stored in the the third memory 27.

Similarly, the third correlator 34 integrates the diffusion signature sequence outputted from another diffusion signature generator different from diffusion signature generator 143 and the output signal from the first memory 202 over the length of the diffusion signature sequence multiplied by an integer. The output of the third correlator 34 is inputted into the first level detector 26. In this case, if the correlation values are greater than a prescribed threshold value, then the diffusion signature generation timings and the correlation values are stored in the third memory 27. On the other hand, if the correlation values are smaller than the prescribed value, then the diffusion signature generation timings and the correlation values are not stored in the third memory 27.

The output from the third memory 27 is inputted into level ranking circuit 204. Then, in order of greatness of the correlation values, upper L phase positions (received phase information) and corelation values are held.

The received phase information in level ranking circuit 204 is inputted into phase shifter 15, and correlation values are calculated by the second correlator 29 and the forth correlator 39 on the basis of this received phase information and the output data from the the second memory 203. At this time, the forth correlator 39 calculates correlation values of phase timings different from that calculated by the the second correlator 29.

Adder 28 adds the output from the the second correlator 29, the output from the forth correlator 39, and the output from ranking circuit 204. The output from adder 28 becomes the correlation value output by the received data given by the output from A/D converter 13. Then, the output from adder 28 is inputted into the second level detector 210.

By iteration of the procedure explained above, L final correlation values as the output from level ranking circuit 204 can be calculated and inputted into the second level detector 210 which arranges this L values in order of greatness of the correlation values.

Similarly, concerning the remaining received phases stored in the third memory 27, the correlation calculation is conducted by the second correlator 29 and the forth correlator 39. Then, the output from level ranking circuit 204, the output from the second correlator 29, and the output from the forth correlator 39 are added by adder 28. The output from adder 28 is inputted into the second level detector 210, and, if the result of addition is greater than the minimum value of the L values calculated beforehand, the third memory 27 is rewritten by the result of addition.

Thus, by calculating the correlation values concerning all the received phases stored in the third memory 27, the upper L phases and the corresponding correlation values are stored in the second level detector 210.

The received phase position such that the correlation value is maximum is fed, as the diffusion signature generation timing, to inverse diffusion circuit (not shown).

As explained above, the calculation speed of the correlation values are doubled by using two correlators that have different phase timings. After all, a plurality of correlators speed up further the correlation processing.

Although the present invention has been shown and described with respect to the preferred modes of embodiment thereof, it should be understood by those skilled in the art that the foregoing and various other changes, omissions, and additions in the form and detail thereof may be made therein without departing from the spirit and scope of the present invention.

What is claimed is:

1. A synchronous capture circuit for code division multiple access communication, wherein a received signal modulated by spectrum diffusion is converted to a base band signal, correlation values of said base band signal at every timing unit defined by the time interval which is smaller than one period of diffusion signature sequence are calculated, said correlation values are integrated over the length of said diffusion signature sequence, a received phase position which the maximum value of said correlation values designates is detected, and the diffusion signature generation timing of said base band signal is estimated within the accuracy of one period of said diffusion signature sequence, which comprises:

a memory means provided with two memory areas for dividing said base band signal into the first received signal and the second received signal by prescribed time unit, and storing them in the first memory area and the second memory area, respectively;

a first correlator for calculating the correlation values of said first received data within one period of said diffusion signature sequence, integrating said correlation values over the length of said diffusion signature sequence, and obtaining the first correlation values;

a first level detector for detecting said first correlation values greater than prescribed threshold level, and storing the detected first correlation values and the diffusion signature generation timings which correspond to said detected first correlation values;

a level ranking circuit for arranging the output from said first level detector in order of greatness, and storing prescribed number of the arranged output and the diffusion signature generation timings which correspond to said arranged output;

a second correlator for calculating the correlation values of said second received data by using the diffusion signature generation timings stored in said level ranking circuit;

an adder for adding the output from said second correlator and the correlation values stored in said level ranking circuit, which have the same received phase as that of the output from said second correlator; and a second level detector for detecting the received phase position that has the maximum correlation value of said base band signal by using the output from said adder.

2. The synchronous capture circuit for code division multiple access communication according to claim 1, wherein the correlation values are calculated at least once, accumulated and outputted as correration values from said first correlator and said second correlator.

3. The synchronous capture circuit for code division multiple access communication according to claim 1, wherein said first correlator and said second correlator are provided with a plurality of correlators, respectively, and each correlator calculates correlation values by using diffusion signature generation timing different with each other.

4. The synchronous capture circuit for code division multiple access communication according to claim 1, wherein said second level detector outputs a plurality of the diffusion signature generation timings in order of greatness of the correlation values.

* * * * *